United States Patent [19]
Geiss et al.

[11] Patent Number: 5,948,314
[45] Date of Patent: Sep. 7, 1999

[54] COMPOSITION CONTAINING AN AEROGEL, METHOD OF PRODUCING SAID COMPOSITION AND THE USE THEREOF

[75] Inventors: Gerhard Geiss, Liederbach; Hans-Karl Müller, Kelsterbach; Werner Prass, Mainz; Ude Scheunemann, Liederbach; Andreas Zimmermann, Griesheim, all of Germany

[73] Assignee: Hoechst Aktiengesellschaft, Frankfurt, Germany

[21] Appl. No.: 08/817,694

[22] PCT Filed: Oct. 10, 1995

[86] PCT No.: PCT/EP95/03989

§ 371 Date: Apr. 17, 1997

§ 102(e) Date: Apr. 17, 1997

[87] PCT Pub. No.: WO96/12683

PCT Pub. Date: May 2, 1996

[30] Foreign Application Priority Data

Oct. 20, 1994 [DE] Germany .............................. 44 37 424

[51] Int. Cl.$^6$ .............................. E04B 1/74; B01J 13/00; C09K 3/00
[52] U.S. Cl. ................ 252/62; 106/287.11; 106/287.16; 106/490; 428/405; 428/404; 516/100
[58] Field of Search ................................... 252/315.2, 62; 428/405, 404; 106/287.16, 490, 287.11; 502/527.24; 516/100

[56] References Cited

U.S. PATENT DOCUMENTS

| | | | |
|---|---|---|---|
| 2,811,457 | 10/1957 | Speil et al. ................................. | 252/62 |
| 2,870,109 | 1/1959 | Nickerson ............................. | 106/490 X |
| 3,600,326 | 8/1971 | Wilcox et al. ....................... | 106/490 X |
| 3,677,784 | 7/1972 | Nitzsche et al. ..................... | 106/490 X |
| 4,059,544 | 11/1977 | Yamaguchi et al. ............ | 502/527.24 X |
| 4,190,457 | 2/1980 | McDaniel .............................. | 502/405 |
| 4,212,925 | 7/1980 | Kratel et al. .................... | 106/287.16 X |
| 4,221,672 | 9/1980 | McWilliams ............................... | 252/62 |
| 4,274,883 | 6/1981 | Lumbeck et al. ...................... | 106/490 |
| 4,363,738 | 12/1982 | Kummermehr ........................... | 252/62 |
| 5,124,364 | 6/1992 | Wolff et al. .............................. | 521/55 |
| 5,656,195 | 8/1997 | Mielke et al. ........................... | 252/62 |

FOREIGN PATENT DOCUMENTS

| | | | |
|---|---|---|---|
| 0027633 | 4/1981 | European Pat. Off. . | |
| 0031166 | 7/1981 | European Pat. Off. . | |
| 0269101 | 6/1988 | European Pat. Off. .......... | 502/572.24 |
| 0340707 | 11/1989 | European Pat. Off. . | |
| 0489319 | 6/1992 | European Pat. Off. . | |
| 0672635 | 9/1995 | European Pat. Off. . | |
| 952723 | 11/1949 | France . | |
| 655612 | 7/1951 | United Kingdom . | |
| 2079172 | 1/1982 | United Kingdom .............. | 502/527.24 |

*Primary Examiner*—Richard D. Lovering
*Attorney, Agent, or Firm*—Frommer Lawrence & Haug LLP

[57] ABSTRACT

The invention relates to a composition comprising between 30 and 95% by volume of aerogel particles and at least one aqueous binder, where the particle diameter of the aerogel particles is less than 0.5 mm and the aerogel particles preferably have hydrophobic surface groups, a process for the preparation thereof, and the use thereof.

13 Claims, No Drawings

COMPOSITION CONTAINING AN AEROGEL, METHOD OF PRODUCING SAID COMPOSITION AND THE USE THEREOF

This application is a §371 of PCT/EP95/03989, filed Oct. 10, 1995, based on Fed. Rep. Germany Application No. P 4437 424.0, filed Oct. 20, 1994.

The invention relates to a composition comprising from 30 to 95% by volume of aerogel particles and at least one aqueous binder, a process for the preparation thereof, and the use thereof.

Because of their very low density and high porosity, aerogels, especially those having porosities greater than 60% and densities less than 0.6 g/cm$^3$, have extremely low thermal conductivity and therefore find application as heat-insulating materials, as described in EP-A-0 171 722.

However, the high porosity also results in low mechanical stability, both of the gel from which the aerogel is dried and also of the dried aerogel itself.

It is also known that aerogels possess exceptionally low dielectric constants having values between 1 and 2, depending on the density of the aerogel. Aerogels are therefore also predestined for electronic applications, for example for high-frequency applications (S. C. W. Hrubesh et al., J. Mater, Res. Vol. 8, No. 7, 1736–1741).

In addition to the abovementioned mechanical disadvantages of aerogels, it is very disadvantageous for electronic applications if the dissipation factor is high. It is known that the dissipation factor on the internal surface is increased by hydrophilic and polar surface groups or adsorbed molecules.

Aerogels are prepared by drying a suitable gel. A dried gel is referred to as aerogel if the gel liquid is removed at temperatures above the critical temperature and starting from pressures above the critical pressure.

If, by contrast, the gel liquid is removed with formation of a liquid-vapor boundary phase, the resulting gel is often also referred to as a xerogel. Unless otherwise stated, the term "aerogel" in the present application also includes xerogels as well as mixtures of these.

The process of shaping of the aerogel is completed during the sol/gel transition. Once the solid gel structure has formed, the external shape can be changed only by comminution, for example by grinding.

For many applications, however, it is necessary to use the aerogels in particular shapes. For this it is necessary, following the preparation of the aerogel, i.e. following the drying, to carry out a shaping step without a significant change in the internal structure of the aerogel with respect to its application.

EP-A-0 377 301 discloses a stable, pumpable, aqueous suspension whose content of amorphous silica is, however, restricted to from 5 to 15% by weight. The low silica content makes possible the formation of a stable, pumpable, aqueous suspension, but excludes any application as a heat-insulating material.

EP-A-0 340 707 discloses an insulating material having a density of from 0.1 to 0.4 g/cm$^3$ comprising at least 50% by volume of silica aerogel particles having a diameter between 0.5 and 5 mm, bound together by at least one organic and/or inorganic binder. The comparatively coarse particle size results in the insulating materials prepared having a non-uniform appearance, which is disadvantageous for many applications. Particularly thin layers (<<0.5 mm) are necessary especially for electronic applications, and these cannot be prepared using the abovementioned aerogel particles.

Furthermore, the coarse particle size of the aerogel makes it impossible to produce film-like heat-insulation articles having a thickness less than 0.5 mm. Film layers of greater thickness are also adversely affected by aerogel particles which are comparatively large in relation to the film thickness, because, especially at the perimeters, an increased binder proportion is necessary, and this has an adverse effect on the thermal conductivity and the electronic properties of the dried film or the dried shaped article.

EP-A-0 340 707 goes on to describe a process in which the aerogel particles are coated and/or mixed with a binder, and the paste thus obtained is then hardened in a mold. Because of the large density difference between the aerogel and the inorganic and/or organic binder, and the size of the aerogel particles, the mixed paste tends to separate, i.e. it is unstable over the relatively long period of time which is necessary for application and storage. As a consequence, shaping can be carried out only by comparatively quick hardening of the mixed paste in an enclosing mold or by reducing the density difference between the aerogel particles and the binder, for example by additionally foaming the binder.

Because the binder has a crucial effect on the eventual thermal conductivity of the dried shaped article, the foaming of the binder takes on still further significance, in that if the binder is hardened without foaming to give a compact solid, the result is a typically high thermal conductivity. Foaming allows the proportion of binder to be reduced, as described in the as yet unpublished German patent application DE-A-44 04 701, giving a lower thermal conductivity. Foaming is, however, an additional and costly process step which must be done in situ and includes the use of a blowing agent. For electronic applications foaming cannot be used.

Furthermore, the particles used as in EP-A-0 340 707 do not have the long-term stability which would be necessary for storage of the aqueous composition, because the OH groups of the aerogel particles have been esterified solely with methanol. Ester groups of this type are, however, susceptible to hydrolysis, as described in R. Iler, The Chemistry of Silica, Wiley & Sons, 1979, pp. 694ff.

The object of the present invention is, therefore, to provide a composition comprising an aerogel which has a sufficiently homogeneous structure for each of the applications, is stable for a relatively long period of time and thus has a good shelf-life, and has aerogel particles which are stable to hydrolysis, so that water can be used as solvent and because of this the composition is easy to dry.

A further object of the present invention is to provide a composition which fulfills the abovementioned criteria, but which additionally possesses, after drying, good adhesion to substrate surfaces. A further object of the present invention is to provide a composition which, in its dried form, has a low dielectric constant and a dissipation factor which is as low as possible.

These objects are achieved according to the invention by means of a composition comprising from 30 to 95% by volume of aerogel particles and at least one aqueous binder, wherein the diameter of the aerogel particles is less than 0.5 mm. The particle diameter refers to the mean diameter of the individual aerogel particle, since the method of preparation of the aerogel particles, for instance by milling, means that they need not necessarily have a spherical shape. The particle diameter distribution depends on the application. Thus, for electronic requirements a structure which is as homogeneous as possible, i.e. a narrow distribution, may be desired. For applications which require a high volume proportion (>66%) of aerogel particles in the composition, the distribution can be broader or even bimodal. In every case, the upper limit of the particle diameter depends on the homogeneity and the shelf-life which are demanded of the composition. Therefore, the only aerogel particles which can be used are those which have a diameter less than 0.5 mm.

At an aerogel particle content which is significantly less than 30% by volume in the composition, this low proportion of aerogel particles means that the advantageous properties in the composition would to a large extent be lost. A composition of this type would not have the high porosities, low densities and low thermal conductivities which are typical of aerogel particles.

An aerogel particle content of significantly greater than 95% by volume would lead to a binder content of less than 5% by volume. In this case, the proportion of binder would be too low in the dried state, i.e. after removal of the water in the binder, to ensure adequate binding of the aerogel particles to each other.

The proportion of aerogel particles is preferably in the range from 50 to 90% by volume, particularly preferably in the range from 50 to 80% by volume.

According to the invention, the particle diameter of the aerogel particles is less than 0.5 mm, preferably less than 0.2 mm. For electronic applications, the diameter can be significantly smaller still. Aerogel particles whose mean particle diameter is larger would give rise to an inhomogeneous i.e. non-uniform, distribution in the composition according to the invention, which is generally a suspension, because of the density difference compared with the aqueous binder and the size of the aerogel particles. Furthermore, problems would result from the particle size, for example on use of the suspension for producing thin films and molded parts.

The dielectric constant of the dried composition should preferably, especially for electronic applications, be <2. Additionally, the dissipation factor should be as small as possible.

Suitable aerogels for the compositions according to the invention are those based on metal oxides which are suitable for the sol-gel technique (C. J. Brinker, G. W. Scherer, Sol-Gel Science, 1990, Chapters 2 and 3), such as, for example, silicon or aluminum compounds, or those based on organic substances which are suitable for the sol-gel technique, such as melamine-formaldehyde condensates (U.S. Pat. No. 5,086,085) or resorcinol-formaldehyde condensates (U.S. Pat. No. 4,873,218). They can also be based on mixtures of the abovementioned materials. Preference is given to aerogels comprising silicon compounds, in particular $SiO_2$ aerogels and very particularly preferably $SiO_2$ xerogels. To reduce the radiative contribution to thermal conductivity, the aerogel can include IR opacifiers such as, for example, carbon black, titanium dioxide, iron oxides or zirconium dioxide, or mixtures thereof.

It is also the case that the thermal conductivity of the aerogels decreases with increasing porosity and with decreasing density. For this reason, aerogels having porosities greater than 60% and densities less than 0.6 g/cm³ are preferred.

In a preferred embodiment, the aerogel particles have hydrophobic surface groups.

It is advantageous for stabilizing the aqueous suspension if hydrophobic groups which are not removed by the action of water are covalently bonded to the internal surface of the aerogels. Suitable groups for permanent hydrophobization are mono-, di- or trisubstituted silyl groups of the formula

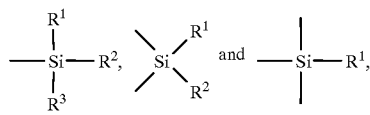

where $R^1$ is hydrogen or a non-reactive linear, branched, cyclic, aromatic or heteroaromatic organic radical, preferably a linear, branched or cyclic $C_1$–$C_{18}$-alkyl radical or a $C_6$–$C_{14}$-aryl radical, and $R^2$ and $R^3$, independently of each other, are identical or different and each is hydrogen or a non-reactive linear, branched, cyclic, aromatic or heteroaromatic organic radical, preferably a linear, branched or cyclic $C_1$–$C_{18}$-alkyl radical, a $C_6$–$C_{14}$-aryl radical, an OH or OR' group, where R' is a linear or branched $C_1$–$C_6$-alkyl radical; preferably trialkyl and/or triarylsilyl groups.

It is particularly preferable if $R^1$, $R^2$ and $R^3$, independently of each other, are identical or different and are $C_1$–$C_6$-alkyl, cyclohexyl or phenyl.

The use of trimethyl- and dimethylsilyl groups for permanent hydrophobization of the aerogel is particularly advantageous. These groups can be introduced as described in WO 94/25 149 or by gas phase reaction between the aerogel and, for example, an activated trialkylsilane derivative, such as for example a chlorotrialkylsilane or a hexaalkyldisilazane (cf. R. Iler, The Chemistry of Silica, Wiley & Sons, 1979). The hydrophobic surface groups prepared in this way furthermore reduce the dissipation factor in comparison with aerogels which have only OH groups on the internal surface.

The aqueous binders used are preferably aqueous dispersions which are used also as binders for colorants, surface coatings and adhesives. The aqueous binder comprises at least one organic polymer and/or inorganic binder dispersed in water and has a water content of less than 90% (v/v).

Such dispersions are also obtainable in great variety as commercial products. Examples are: vinyl acetate homo- and copolymer dispersions, ethylene-vinyl acetate dispersions, styrene-acrylate and styrene-butadiene copolymer dispersions and acrylate dispersions.

Inorganic binders, such as, for example, waterglass, aqueous solutions of phyllosilicates, or colloidal $SiO_2$ are also suitable. Likewise suitable are mixtures of inorganic and/or organic binders.

The dispersions can be stabilized either by surfactants or by protective colloids; stabilization by a combination of one or more protective colloids with one or more ionic and/or non-ionic surfactants is also possible. The binder should have good compatibility with the aerogel. If necessary, binders can be used which give, after drying, a water-resistant agglomeration of the aerogel particles. Water resistance of this type can be achieved by known methods, such as, for example, crosslinking. It is also advantageous if the solids content of the binder is as high as possible and its volume proportion in the mixture with the aerogel is as small as possible.

In order to obtain shaped articles which are hard and dimensionally stable, a dispersion should be chosen in which the glass transition temperature of the polymer is above room temperature. Conversely, for production of soft insulation materials it is necessary to choose a dispersion in which the glass transition temperature of the polymer is lower than the service temperature.

For thermal applications, it can also be advantageous if the composition includes fibers. The fibrous material can be either inorganic fibers, such as for example glass fibers, mineral fibers, silicon carbide fibers or carbon fibers, or organic fibers, such as for example polyester fibers, aramid fibers or nylon fibers. The fibers can also be coated, for example polyester fibers metallized with a metal such as aluminum.

The flammability classification of the article obtained after drying is determined by the flammability classification of the aerogel and of the binder and, if used, of the fiber material. In order to obtain the best possible flammability classification for the composite (low flammability or non-combustible), the binder should consist of inorganic binders and the fibers of non-combustible material, for example mineral or glass fibers, or of low-flammability fibers, such as for example melamine resins, specific polyester fibers ("CS") or polybenzimidazoles (PBIs).

In order to avoid an increase in thermal conductivity caused by the added fibers, a) the proportion by volume of the fibers should be from 0.1 to 30%, preferably 1 to 10%, and b) the thermal conductivity of the fiber material should preferably be <1 W/mK.

By means of a suitable choice of fiber diameter and/or fiber material, the radiation contribution to the thermal conductivity can be reduced and an increased mechanical strength can be achieved.

For these purposes, the fiber diameter should be a) for non-metallized fibers preferably from 0.1 to 30 $\mu$m and/or b) for metallized fibers preferably 0.1 to 20 $\mu$m.

The radiation contribution to the thermal conductivity can be further reduced by using blackened fibers, such as, for example, polyester fibers blackened with carbon black or simply carbon fibers.

It is also possible to add carbon black as additive to the composition. For this, carbon black varieties which have small particle diameters and as low a crystallinity as possible are particularly suitable.

The mechanical strength of the article obtained after drying is also influenced by the length and distribution of the fibers in the composition.

The compositions according to the invention can be prepared by mixing the aerogel particles, and if desired the fibers and/or the carbon black, with the aqueous binder.

This mixing can be carried out in any desired manner. Thus, either the components, of which there are at least two, can be introduced simultaneously into the mixing apparatus, or one of the components can be introduced first and the others then added.

There is also no restriction on the mixing apparatus necessary for the mixing. Any mixing apparatus known for this purpose to a person skilled in the art can be used.

The mixing operation is continued until an almost uniform distribution of the aerogel particles is present in the composition. It can controlled both by means of its duration and also, for example, by means of the speed of the stirring device.

After drying, the compositions according to the invention are suitable, because of their low thermal conductivity, as heat insulation materials, or, because of their small dielectric constant and their small dissipation factor, for electronic applications.

The composition according to the invention is preferably dried in a temperature range of from 0 to 100° C. The drying process to be used can be selected from a variety of processes known to a person skilled in the art.

The compositions according to the invention are also themselves suitable as binders for other materials, in particular insulating materials, such as, for example, aerogel particles (having large particle diameter) in granule form.

The suspensions according to the invention can, because of their flowability, be poured or pumped into any type of mold so that, after drying, corresponding shaped articles of insulating material are formed.

It is also possible to apply the compositions according to the invention, for example in the form of a suspension, onto surfaces as a coating; their adhesion makes them very suitable for this purpose. It may be advantageous if the surface is activated in advance by common processes, such as, for example, electrical discharges, thus improving the adhesion. It is also possible additionally to apply specialized adhesion promoters and/or intermediate layers, for example of silicate, to the actual substrate before the composition is applied. Suitable application processes are, for example, spraying, knife-coating, brushing or dipping. Drying of the applied layers gives surface coatings which have good adhesion, are heat-insulating and sound-absorbing, have low dielectric constant and small dissipation factor.

The compositions according to the invention can also be used as sound absorption materials, either as they stand or in the form of resonance absorbers, since they have a low sound transmission velocity and a higher sound insulation effect than unreinforced aerogels.

It is likewise possible to increase the performance of ultrasound transmitters by applying a composition of this type in the form of a layer.

The invention is described in further detail below by means of working examples.

EXAMPLE 1

125 ml of hydrophobic aerogel granules having a particle size in the range from 50 to 250 $\mu$m (bulk density 0.08 g/cm$^3$) are mixed with an initial charge of 60 ml of an aqueous dispersion of styrene-acrylate copolymer, solids content: 19% by weight (34 ml Mowilith DM 760, 26 ml water) in a 200 ml beaker, using a propeller stirrer at 1200 rpm for 20 min until a flowable suspension is formed. The suspension is then drawn out between 2 barriers corresponding to the final thickness of the casting and dried for 4 h at 80° C.

After drying, a white casting having a density of 0.175 g/cm$^3$ is formed. The thermal conductivity is 0.035 W/mK.

EXAMPLE 2

125 ml of hydrophobic aerogel granules having a particle size in the range from 50 to 250 $\mu$m (bulk density 0.08 g/cm$^3$) are mixed with an initial charge of 60 ml of an aqueous dispersion of styrene-acrylate copolymer, solids content: 19% by weight (34 ml Mowilith DM 760, 26 ml water) in a 200 ml beaker, using a propeller stirrer at 1200 rpm for 20 min until a flowable suspension is formed. The suspension is then drawn out between 2 barriers corresponding to the final thickness of the casting and dried for 12 h at ambient temperature.

After drying, a casting of thickness 1 mm having a density of 0.177 g/cm$^3$ is formed. The thermal conductivity is 0.035 W/mK.

EXAMPLE 3

125 ml of hydrophobic aerogel granules having a particle size in the range of 50 to 250 $\mu$m (bulk density 0.08 g/cm$^3$) are mixed with an initial charge of 60 ml of an aqueous dispersion of styrene-acrylate copolymer, solids content: 28% by weight (34 ml Mowilith DM 611, 26 ml water) and 3.5% by weight (based on the aerogel mass) of glass fibers having a length of 4.5 mm in a 200 ml beaker, using a propeller stirrer at 1200 rpm for 15 min until a flowable suspension is formed. The suspension is then drawn out between 2 barriers corresponding to the final thickness of the casting and dried for 7 h at 80° C.

After drying, a casting of thickness 6 mm having a density of 0.17 g/cm$^3$ is formed. The thermal conductivity is 0.046 W/mK.

EXAMPLE 4

125 ml of hydrophobic aerogel granules having a particle size in the range of 50 to 250 μm (bulk density 0.08 g/cm$^3$) are mixed with an initial charge of 60 ml of an aqueous dispersion of acrylate-vinyl acetate-ethylene copolymer, solids content: 28% by weight (26 ml Mowilith VDM 1340, 34 ml water) in a 200 ml beaker, using a propeller stirrer at 1200 rpm for 20 min until a slightly pasty suspension is formed. The suspension is then drawn out between 2 barriers corresponding to the final thickness of the casting and dried for 6 h at 80° C.

After drying, a casting of 5 mm thickness having a density of 0.14 g/cm$^3$ is formed. The thermal conductivity is 0.032 W/mK.

The thermal conductivity of the castings in Examples 1 to 4 was measured using a hot wire method (cf. for example 0. Nielsson, G. Ruischenpöhler, J. Groβ, J. Fricke, High Temperatures-High Pressures, Vol. 21, 267–274 (1989))

We claim:

1. A composition comprising from 30 to 95% by volume of aerogel particles and at least one aqueous binder, wherein the particle diameter of the aerogel particles is less than 0.5 mm, and wherein the aerogel particles have permanent hydrophobic surface groups on the internal surface.

2. A composition as claimed in claim 1, wherein the particle diameter of the aerogel particles is less than 0.2 mm.

3. A composition as claimed in claim 1, wherein the aerogel is an SiO$_2$ aerogel.

4. A composition as claimed in claim 1, wherein the hydrophobic surface groups are trialkylsilyl groups and/or triarylsilyl groups.

5. A composition as claimed in claim 1, wherein the aerogel particles have porosities of greater than 60% and densities of less than 0.6 g/cm$^3$.

6. A composition as claimed in claim 1, wherein the aqueous binder is a dispersion which comprises at least one organic polymer and/or inorganic binder and has a water content of less than 90% (v/v).

7. A composition as claimed in claim 1, wherein the composition includes from 0.1 to 30% by volume of fibers.

8. A composition as claimed in claim 1, wherein the composition includes an IR opacifier.

9. A process for preparing a composition as claimed in claim 1, wherein the aerogel particles are mixed with the aqueous binder.

10. An auxiliary material useful in electrical engineering comprising the composition of claim 1.

11. An insulating material comprising the composition of claim 1.

12. An adhesive comprising the composition of claim 1.

13. A film comprising the composition of claim 1.

* * * * *